United States Patent [19]
Daubman et al.

[11] 3,814,260
[45] June 4, 1974

[54] KNIFE ADVANCE MECHANISM

[75] Inventors: Edward A. Daubman; John W. Sherlock, both of East Moline, Ill.

[73] Assignee: Ametek, Inc., New York, N.Y.

[22] Filed: June 9, 1972

[21] Appl. No.: 261,535

[52] U.S. Cl. ............................ 210/396, 210/402
[51] Int. Cl. ........................................ B01d 33/06
[58] Field of Search .......... 15/256.53; 210/75, 193, 210/396, 397, 402–404, 420, 421

[56] References Cited
UNITED STATES PATENTS

| | | | |
|---|---|---|---|
| 2,076,611 | 4/1937 | Barnebl | 210/396 |
| 2,202,932 | 6/1940 | Tingey | 210/396 X |
| 2,470,400 | 5/1949 | Hornbostel | 15/256.53 |
| 3,088,156 | 5/1963 | Ljungquist et al. | 15/256.53 |
| 3,263,816 | 8/1966 | Krynski | 210/402 X |
| 3,578,163 | 5/1971 | Warning | 210/396 X |
| 3,688,337 | 9/1972 | Noda | 15/256.53 |

FOREIGN PATENTS OR APPLICATIONS

| | | | |
|---|---|---|---|
| 849,554 | 9/1960 | Great Britain | 210/193 |

*Primary Examiner*—John Adee
*Assistant Examiner*—Robert H. Spitzer
*Attorney, Agent, or Firm*—Smythe & Moore

[57] ABSTRACT

The filter cake accumulating on the cylindrical surface of a horizontal rotary drum filter is removed by a knife blade or scraper disposed adjacent the surface, the knife blade being mounted on a table which is movable toward and away from the drum on friction inhibiting supports. A variable speed driving mechanism is provided for slowly advancing the table toward the drum, and a fast speed driving mechanism is provided for rapidly positioning the table toward and away from the drum. The table is movably mounted by means of ball bushings on steel shafts fixed upon a supporting member. Cake slitting means and deflector plates are provided for guiding the scraped cake away from housings enclosing the ball bushings and away from the drum.

6 Claims, 9 Drawing Figures

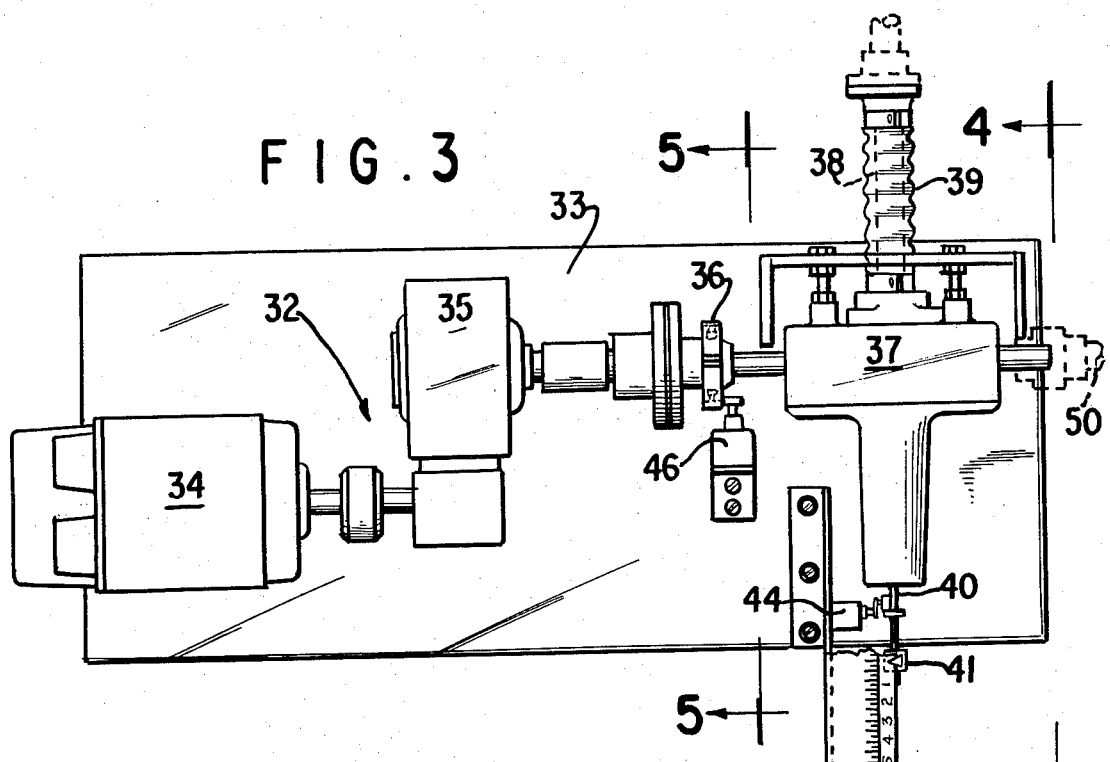
FIG.3
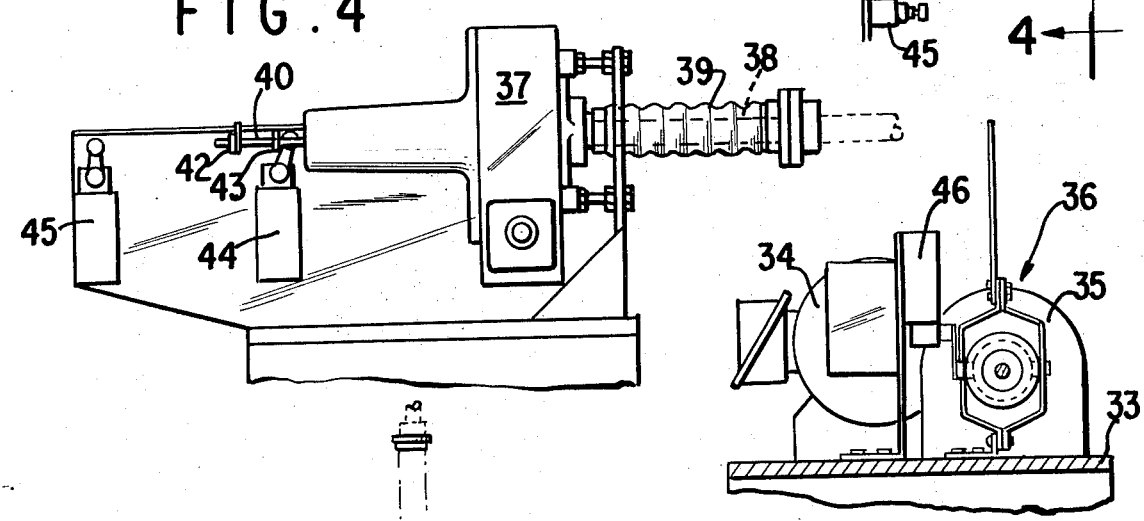
FIG.4
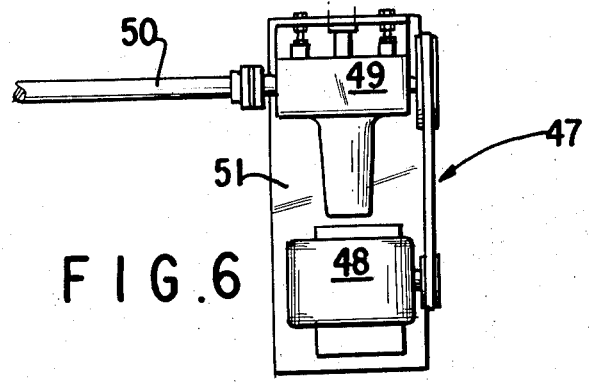
FIG.6
FIG.5

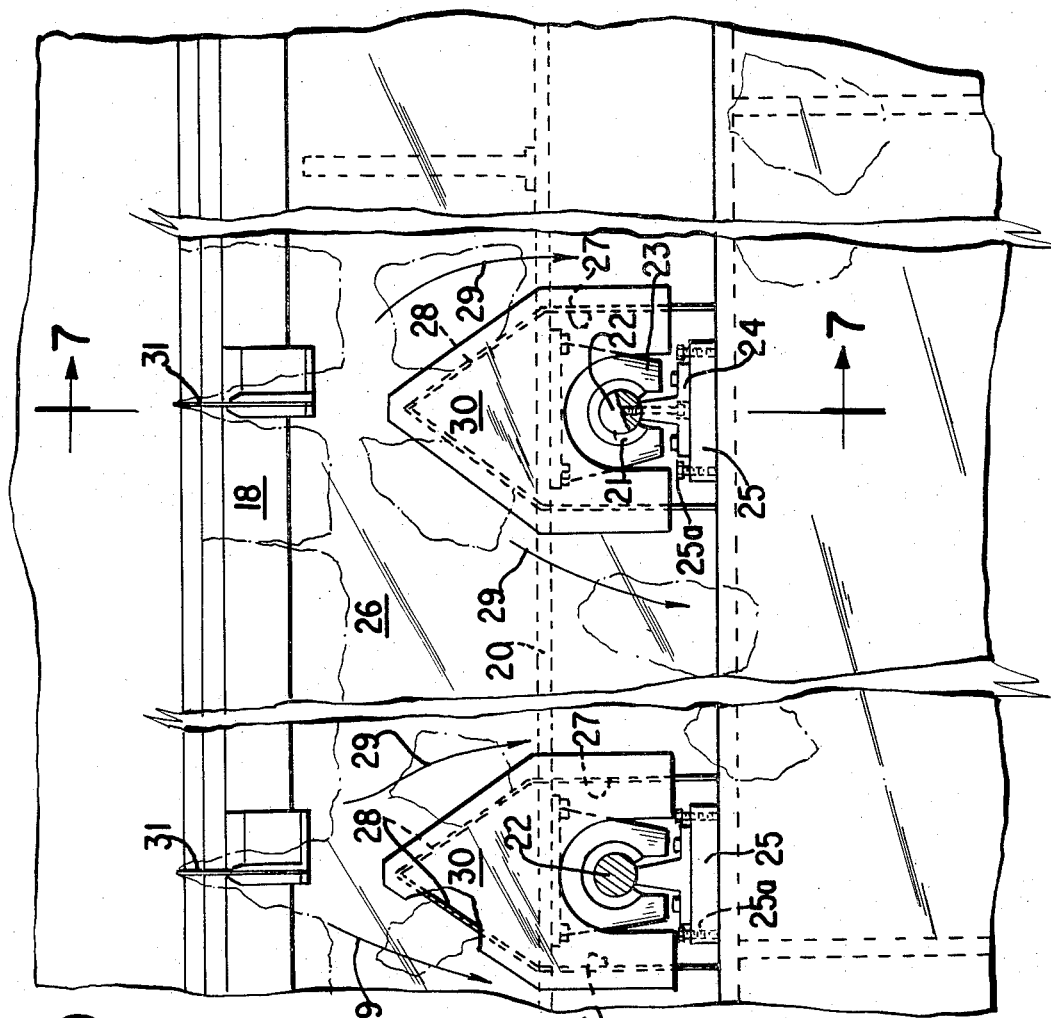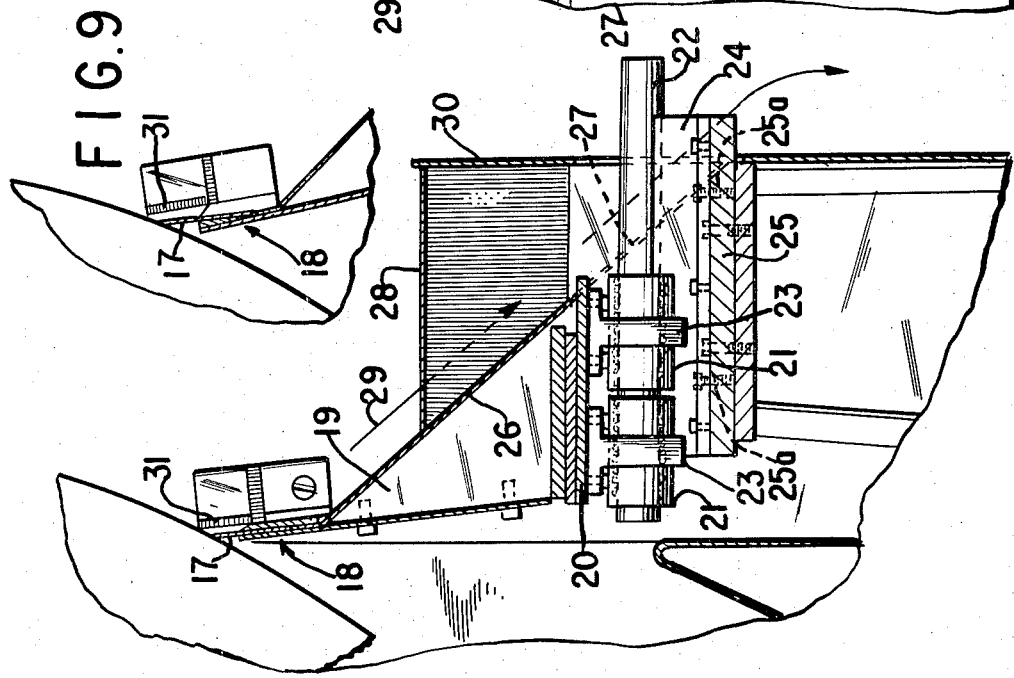

KNIFE ADVANCE MECHANISM

This invention relates to rotary drum filters and knife scrapers therefor.

In a horizontal rotary drum filter, the liquid to be filtered flows into the rotating drum, and solids within the liquid progressively accumulate on the outer surface of the drum. These solids accumulate to form a filter cake which is thereafter removed from the cylindrical surface. The cake is generally removed by means of a knife or scraper positioned closely adjacent the drum so as to remove the outer portion of the cake accumulating to a predetermined depth. Where the drum is long, there have been difficulties in accurately positioning the knife blade adjacent the drum so as to accurately remove the accumulated filter cake. Inaccuracies in the removal of the cake generally arise from deflections of the blade during operation. In addition, the structure for adjusting the position of the knife blade with respect to the accumulated filter cake has been complex and heavy in an attempt to obtain accurate positioning of the scraper blade.

One of the objects of the present invention is to provide an improved advance mechanism for the scraper knife on a horizontal rotary drum filter.

Another object of the present invention is to provide such a knife advance mechanism which permits accurate positioning of the knife and virtually eliminates deflection problems of the knife during operation.

In one aspect of the invention, a horizontal rotary drum filter may be provided with a knife blade disposed adjacent the cylindrical surface of the drum to remove accumulated filter cake from the drum surface. The knife blade table is movable toward and away from the drum. Spaced support means are provided on the movable table for mounting of the knife blade thereon. Additionally, means are provided to support the table on ball bushings engaging rod means so as to eliminate or inhibit frictional forces. Motor means are drivingly connected to the movable table for moving the table toward and away from the drum at variable speeds. The motor means comprises a variable speed driving mechanism for slowly advancing the table toward the drum and, in addition, a fast speed driving mechanism for rapidly positioning the table toward or away from the drum.

Other objects, advantages, and features of the present invention will become apparent from the accompanying description and drawings, which are merely exemplary.

In the drawings:

FIG. 3 is a top plan view of the variable speed driving mechanism for slowly advancing the knife blade table toward the drum as viewed along line 3—3 of FIG. 2;

FIG. 4 is a side elevational view of the mechanism of FIG. 3 viewed in the direction of line 4—4 of FIG. 3;

FIG. 5 is a sectional view taken along line 5—5 of FIG. 3;

FIG. 6 is a top plan view of the fast speed driving mechanism as viewed along line 6—6 of FIG. 2;

FIG. 7 is a sectional view taken along the line 7—7 of FIG. 8;

FIG. 8 is a front elevational view in enlarged scale of a portion of the knife advance mechanism illustrated in FIG. 2; and FIG. 9 is a portion of FIG. 7 showing the knife blade adjusted to another position.

Proceeding next to the drawings wherein like reference symbols indicate the same parts throughout the various views, a specific embodiment of the present invention will be described in detail.

Figure 1:
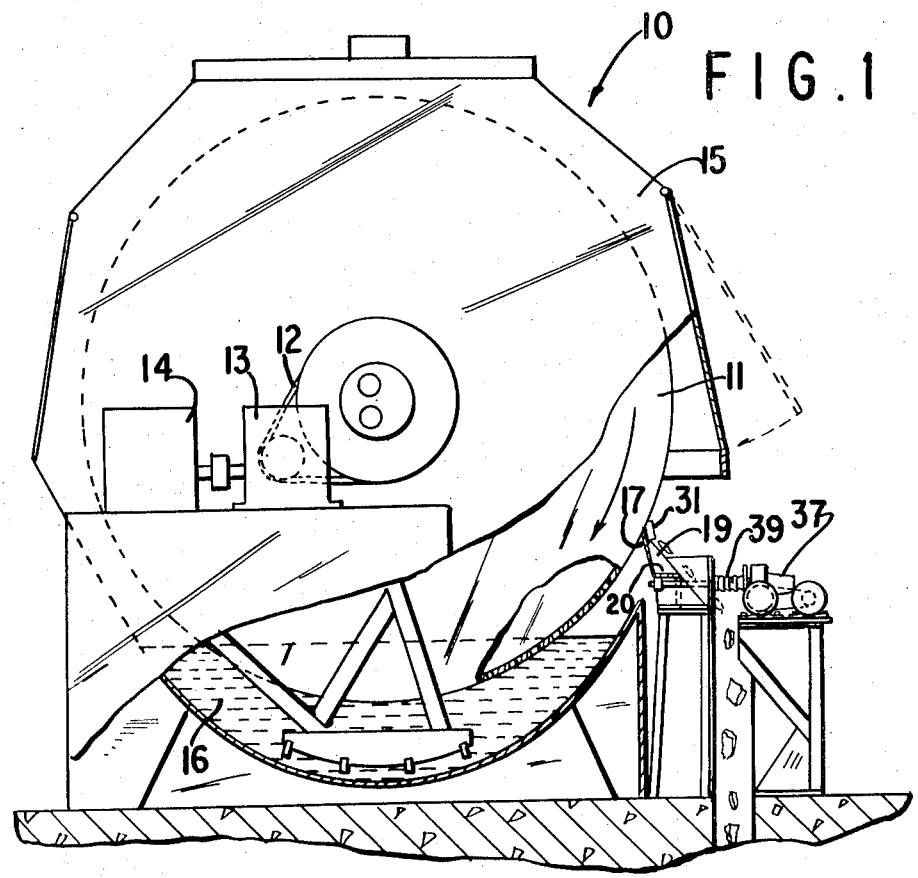
FIG. 1 is an end elevational view of a horizontal rotary drum filter incorporating a knife advance mechanism of the present invention with a portion of the filter being shown in section.
Figure 2:
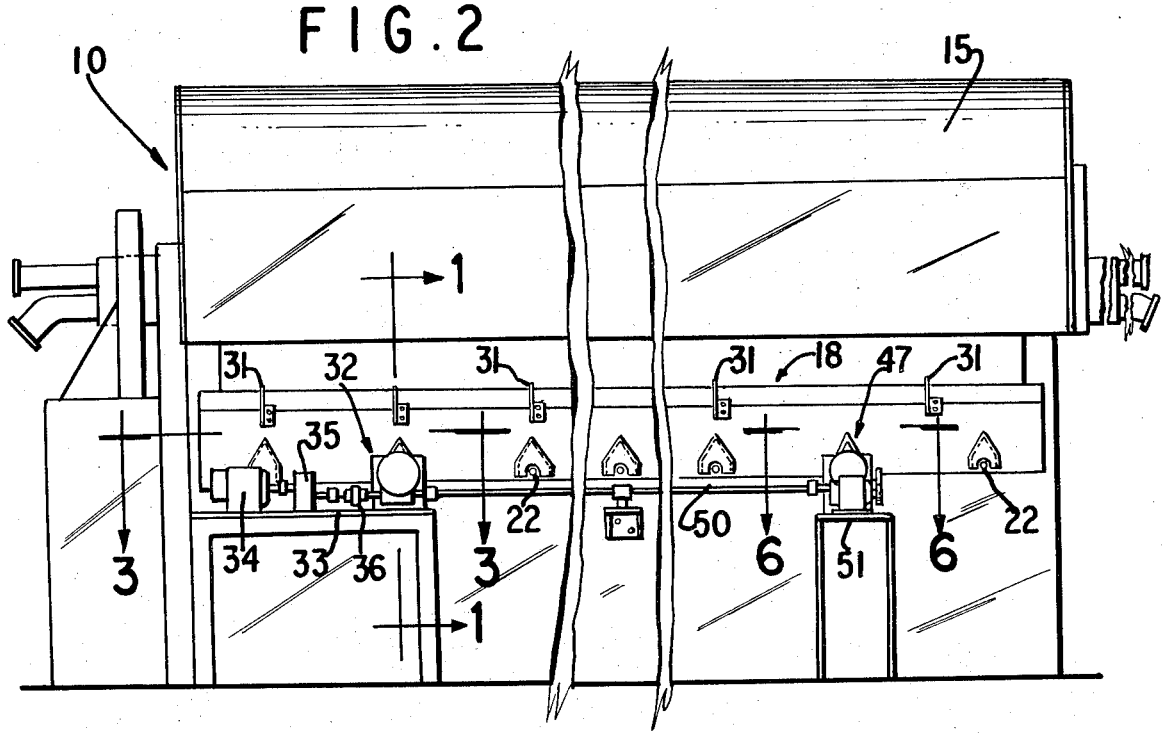
FIG. 2 is a front elevational view of the filter of FIG. 1.

As may be seen in FIGS. 1 and 2, a horizontal rotary drum filter is indicated generally at 10 comprising a rotary filter drum 11 drivingly connected at 12 to a suitable speed reducer 13 and motor 14. The drum is rotated in a housing or trough 15 in the bottom of which is slurry 16 to be filtered. As is known in the art, a vacuum can be applied to the interior of drum 11 to draw the liquid therethrough and deposit solids or cake on the exterior thereof. Various arrangements of the drum and pressure differential application thereto can be used.

In order to remove accumulated filter cake from the outer cylindrical surface of drum 11, there is provided a scraper or knife blade 17. Knife blade 17 is mounted on knife support 18 and is adjustable thereon by a standard screw holding arrangement so that the knife blade may be positioned between the positions as shown in FIGS. 7 and 9. In FIG. 9, the blade is extended upwardly relative to the position shown in FIG. 7. Preferably, the knife blade is below the center line of the drum. Each knife support 18 is mounted on a plurality of triangular gusset plates 19 upon longitudinally extending knife support table 20 which is arranged to be movable in a horizontal plane toward and away from the drum.

Attached to the underside of movable table 20 is a plurality of ball bushings 21 which are slidably mounted upon a corresponding plurality of hardened steel shafts 22 carried by brackets 23 upon bases 24, bases 24 being mounted on supporting member 25. The ball bushings and supports are located at predetermined spacings along the filter, which are relatively short spaces, so as to guide the knife table 20 and knife to inhibit deflection of the knife blade. The ball bushings provide for free and effortless movement of the knife during advance and retraction of the knife table relative to the filter drum. Elevating bolts 25A can be provided to assist in vertically aligning the ball bushings 21. Merely by way of example, for a drum filter about 23 feet in length, the ball bushing supports can be spaced about 5 feet 6 inches apart. The spacing, of course, depends upon the particular filter and use.

Extending downwardly from the upper edge of a knife support 18 is a deflector plate 26 having portions thereof cut away at 27 to accommodate shafts 22. Each of the ball housings is enclosed by a triangular-shaped housing 28 which functions to deflect filter cake away from the ball bushings in the directions indicated by arrows 29.

The outer ends of the ball bushing housings 28 are enclosed by vertical plates 30 which form flanges to assist in directing the removed filter cake downwardly.

Positioned above each of the ball bushing housings are vertical slitting blades 31 which function to cut the cake and to deflect it away from the protecting housings over the ball bushings and their support shafts 22.

The vertical slitting blades 31 also prevent tearing of the precoat face of the accumulated cake remaining on the drum, such tearing generally resulting from the discharge cake bunching up against the protective housings and lifting the cake sheet away from the cutting edge of the knife.

A variable speed driving mechanism is indicated generally at 32 (FIGS. 2, 3) and is mounted upon a common base 33 to facilitate leveling and aligning. The mechanism can include direct current motor 34 with an SCR control. The motor can drive gear reducer 35 coupled to a manually operable clutch 36 and a special worm speed reducer means 37 fitted with an acme threaded rod 38 which is used to drive the knife table 20. The acme threaded rod may be enclosed with a flexible casing 39 to protect the threads from discharged cake. Other types of speed reducers and drives can be used.

Rod extension 40 from threaded rod 38 is provided with an indicator pointer 41 which indicates the depth of cut of precoat remaining on the drum surface. Also mounted on shaft extension 40 are collars 42 and 43 which actuate limit switches 44 and 45 to prevent the knife from coming into contact with the drum and to limit retraction of the knife. A limit switch 46 may also be provided with the manual clutch 36 to indicate disengagement before the fast speed driving mechanism, about to be described, can be used.

The fast speed driving mechanism is indicated generally at 47 in FIG. 6 and can comprise an electric motor 48 driving a gear unit 49 which is coupled to the first worm gear unit 37 by means of a shaft 50. The motor 48 and reducer 49 are also mounted on a single base 51 to facilitate leveling and adjustment. The electric motor 48 is connected so that it only can be operated if manual clutch 36 on the variable speed unit is disengaged. A reversing starter is provided to advance or retract the knife blade by use of the fast speed driving mechanism 47.

As previously mentioned, mounting of the movable knife support table by means of ball bushings on hardened steel shafts permits free and frictionless movement of the tables. This permits accurate and precise adjustment of the knife blade with respect to the drum and consequently an accurate removal of the accumulated filter cake.

Since the knife blade is supported by a plurality of spaced ball bushings, the knife blade has essentially short spanned supports which thus minimize deflection of the blade. Furthermore, the knife support will result in machining surfaces of accumulated filter cake in a manner to maintain flatness, parallelism and perpendicular surfaces where required.

It will be understood that changes in various details of construction and arrangement of parts may be made without departing from the spirit of the invention except as defined in the appended claims.

What is claimed is:

1. In a horizontal rotary drum filter, the combination including frame means, an elongated generally horizontal knife blade table movable toward and away from said drum, knife blade means extending upwardly from said table, a supporting base for said table, depending bracket means spacedly arranged on said table, ball bushing means in said bracket means partially encircling and slidably arranged on spaced friction inhibiting shafts below and spaced generally parallel to said table, said shafts being fixedly supported by upstanding supports in spaced relation above said base and for slidably supporting said table on said supporting base and relative to said frame means and filter, and shaped deflector plates spacedly depending from said knife blade means, and housing means having deflecting walls enclosing and protecting said bracket means and shafts, said deflector plates and deflecting walls directing the filter cake removed by said knife blade means downwardly over said housing means.

2. A horizontal rotary drum filter as claimed in claim 1 having variable speed motor means drivingly connected to said table for slowly advancing the table toward the drum, and fast speed driving mechanism for rapidly positioning the table toward or away from the drum.

3. A horizontal rotary drum filter as claimed in claim 2 wherein there are spaced screw thread means connected to said movable table for moving said table toward and away from said drum.

4. A horizontal rotary drum filter as claimed in claim 3 including means for driving said screw thread means at variable speeds.

5. A horizontal rotary drum filter as claimed in claim 4 wherein there is an adjustable slow speed drive means and a fast speed drive means, said fast speed drive means being disengageable from said slow speed means when the fast speed means is activated.

6. A horizontal rotary drum filter as claimed in claim 1 and comprising spaced cake slitting means adjacent said support means for dividing the cake as it is removed from the drum.

* * * * *